(12) United States Patent
McLemore et al.

(10) Patent No.: US 6,491,195 B1
(45) Date of Patent: Dec. 10, 2002

(54) CARRIER DEVICE

(76) Inventors: John D. McLemore, 105 Hickory Ct., Fortson, GA (US) 31906; Don McLemore, 450 Brown Ave., Columbus, GA (US) 31906

( * ) Notice: Subject to any disclaimer, the term of this patent is extended or adjusted under 35 U.S.C. 154(b) by 1 day.

(21) Appl. No.: 09/643,877

(22) Filed: Aug. 23, 2000

Related U.S. Application Data

(63) Continuation-in-part of application No. 09/382,803, filed on Aug. 25, 1999, now Pat. No. 6,244,483.

(51) Int. Cl.$^7$ ................................................ B60R 9/10
(52) U.S. Cl. ........................ 224/537; 224/521; 224/534; 224/924
(58) Field of Search ................................ 224/924, 488, 224/502, 504, 509, 518–524, 533, 534, 537

(56) References Cited

U.S. PATENT DOCUMENTS

| | | | |
|---|---|---|---|
| 3,163,399 A | 12/1964 | Merchant | 224/504 |
| 3,989,265 A | 11/1976 | Smiley | |
| 4,046,398 A | 9/1977 | Dunwoody | 224/519 |
| 4,204,702 A | 5/1980 | Oltrogge | |

(List continued on next page.)

FOREIGN PATENT DOCUMENTS

| | | | | |
|---|---|---|---|---|
| FR | 2642024 A1 | * | 7/1990 | 224/924 |
| GB | 2235909 A | | 3/1991 | 224/924 |

OTHER PUBLICATIONS

"Outdoor Cooking Made Simple, e.g. Gas & Charcoal Smokers—Turkey Fryers—Fish Fryers, Camp Cookers—Cookware—Spices—Videos—Cargo Carriers", 1992, pp. 1–12, Masterbuilt Mfg. Inc., Camping Supply Publication (25 Years).

Camping World "Master 1997" brochure, p. 36.

*Primary Examiner*—Gregory M. Vidovich
(74) *Attorney, Agent, or Firm*—Smith, Gambrell & Russell, LLP

(57) ABSTRACT

A bike carrier that includes an extension support having a vehicle support end and a second end as well as a side rail structure supported by the extension support. The side rail structure has a first section extending to a first side of the extension support and a second section extending to a second side of the extension support, and the first and second sections are arranged for supporting a respective wheel of a bike when in use. The carrier device also includes a first wheel hold down device positioned on the first side of the extension support and an intermediate support device supported by the extension support (e.g. either directly or indirectly such as via an intermediate side rail section) so as to contact a frame component of the bike when in use. The intermediate support device has an upper frame contact section that is positioned, when is use, for contact with the lower sloping frame component of the bike which extends to the hub typically. The upper contact section includes a sloped neck section which includes a frame reception recess of a slope generally corresponding to that of the sloped frame section received in the recess. A frame hold down device such as a strap is threaded through the neck section for wrapping around the sloped frame section of the bike. The intermediate support device is also preferably adjustable in height and fixed in position by the position adjustment device at a desired bike frame contact height. In addition to the intermediate frame contact device and the first wheel hold down device (which is preferably in the form of a cradle slideable along the rail structure) a second wheel hold down device, such as an independent strap, is provided for the second wheel. The invention also features a modular stacking arrangement of the same.

16 Claims, 9 Drawing Sheets

U.S. PATENT DOCUMENTS

| | | | |
|---|---|---|---|
| 4,318,501 A | 3/1982 | Graber | |
| 4,381,069 A | 4/1983 | Kreck | 224/502 |
| 4,702,401 A | 10/1987 | Graber et al. | |
| 4,815,638 A | 3/1989 | Hutyra | |
| 4,823,997 A | 4/1989 | Krieger | |
| 4,875,608 A | 10/1989 | Graber | |
| 4,938,399 A | 7/1990 | Hull et al. | |
| 5,025,932 A | 6/1991 | Jay | 211/20 |
| 5,038,980 A | 8/1991 | Baldeck | 224/42.03 |
| 5,042,705 A * | 8/1991 | Johansson | |
| 5,118,018 A | 6/1992 | Baldeck | 224/42.03 |
| 5,232,134 A | 8/1993 | Allen | |
| 5,259,542 A * | 11/1993 | Newbold et al. | |
| 5,269,446 A | 12/1993 | Biehn | |
| 5,282,555 A | 2/1994 | Muir et al. | |
| 5,373,978 A | 12/1994 | Buttchen et al. | 224/42.03 |
| 5,377,886 A | 1/1995 | Sickler | 224/42.45 |
| 5,395,020 A | 3/1995 | King | |
| 5,460,304 A | 10/1995 | Porter et al. | |
| 5,469,997 A | 11/1995 | Carlson | 224/521 |
| 5,476,202 A | 12/1995 | Lipp | 224/532 |
| 5,476,203 A | 12/1995 | Fletcher | 224/924 |
| 5,497,927 A | 3/1996 | Peterson | 224/519 |
| 5,549,231 A | 8/1996 | Fletcher et al. | 224/924 |
| 5,560,526 A | 10/1996 | Jantzen et al. | |
| 5,570,825 A | 11/1996 | Cona | 224/495 |
| 5,593,139 A | 1/1997 | Julian | |
| 5,647,521 A | 7/1997 | Burgess | 224/924 |
| 5,690,260 A | 11/1997 | Aikins et al. | |
| 5,695,103 A | 12/1997 | Duvernay et al. | 224/924 |
| 5,699,985 A | 12/1997 | Vogel | 224/924 |
| 5,775,555 A | 7/1998 | Bloemer et al. | |
| 5,794,828 A * | 8/1998 | Colan et al. | |
| 5,810,542 A | 9/1998 | Ostrander | |
| 5,820,004 A | 10/1998 | Lane | |
| 5,833,074 A | 11/1998 | Phillips | |
| 5,850,959 A | 12/1998 | Miller | |
| 5,862,966 A | 1/1999 | Mehls | |
| 5,871,131 A | 2/1999 | Low et al. | |
| 5,879,102 A | 3/1999 | Koliopoutos | |
| 5,881,937 A | 3/1999 | Sadler | |
| 5,884,824 A | 3/1999 | Spring et al. | 224/310 |
| 5,884,930 A | 3/1999 | Clutch | 224/521 |
| 5,988,403 A * | 11/1999 | Robideau | |
| 6,006,973 A | 12/1999 | Belinky et al. | 224/924 |
| 6,019,266 A * | 2/2000 | Johnson | |
| 6,244,483 B1 * | 6/2001 | McLemore et al. | |

\* cited by examiner

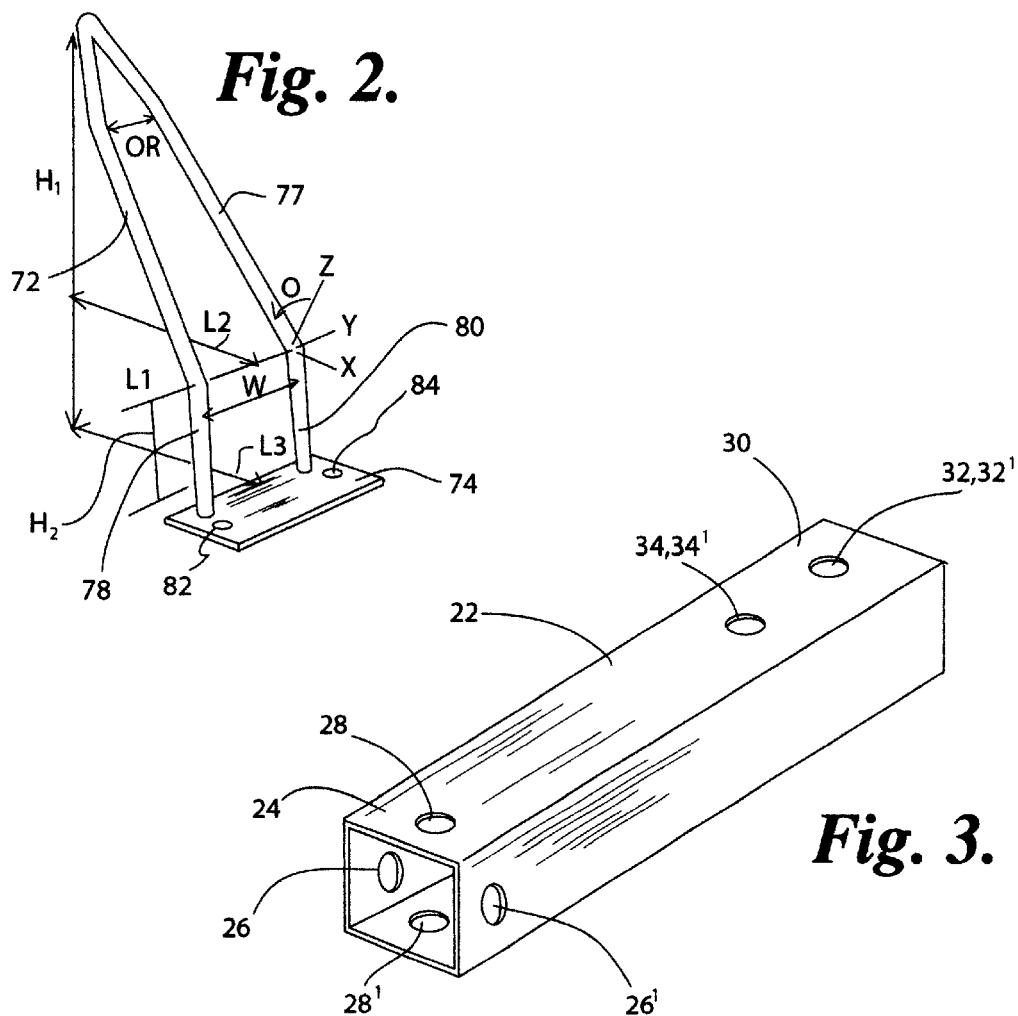
*Fig. 2.*
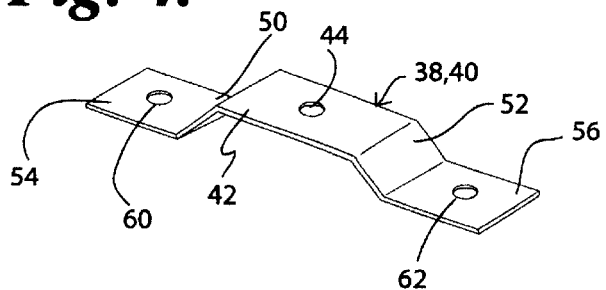
*Fig. 3.*
*Fig. 4.*
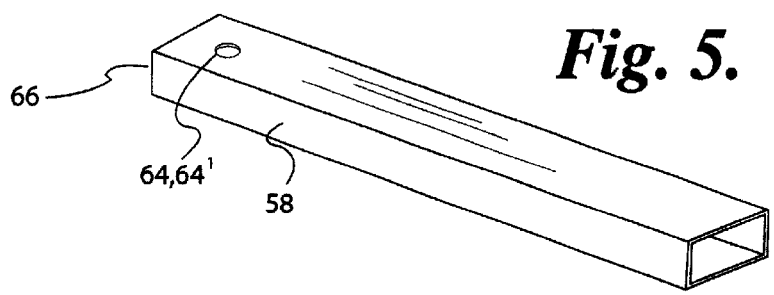
*Fig. 5.*

CARRIER DEVICE

CROSS-REFERENCE TO RELATED APPLICATIONS

This application is a continuation-in-part of U.S. Pat. Ser. No. 09/382,803 filed Aug. 25, 1999 now U.S. Pat. No. 6,244,483.

FIELD OF THE INVENTION

The present invention relates to a carrier device, which, in one preferred embodiment, is a bike carrier that is suited for attachment to a vehicle. The present invention further features a modular carrier structure that is interconnectable with other carrier structures to form a carrier assembly with the modular carrier structures preferably being arranged in a vertically stacked or staggered arrangement.

BACKGROUND OF THE INVENTION

A plurality of bike carrier designs have been developed including compact strap designs that position a bike on the upper surface of a bumper and rely on strap, buckle and trunk hook components to secure the bike to the body of the vehicle. Examples of this type of bike carrier can be seen in U.S. Pat. Nos. 5,118,018 and 5,038,980. In addition to the potential damage to the vehicle created by the hook and buckle components, bike carriers of this type are generally limited to single bike support and also often involve a great deal of set up and adjustment. One advantage of this type of carrier is, however, that they can be made rather compact for shipping and retail shelf space requirements.

There also exists in the art carriers for bikes and other items that include components that attach directly to a vehicle body such as the roof of the vehicle. An example of this type of carrier can be seen in U.S. Pat. No. 5,884,824. These type of carriers are applied on a more permanent basis as compared to the hook and strap arrangements described above and thus are typically not easy to remove and instal and also introduce the added possibility of damage to the vehicle body.

The prior art also features bike carriers that are designed to extend out away from the rear end of a vehicle from an attachment point in the bumper region of the vehicle such as from a square hitch common on many vehicles, particularly sports utility vehicles or SUV's. Many of these bicycle carriers include carriers with a relatively lengthy vertical main support bar from the top of which extends horizontal support beams that are provided with clamps or the like to attach to a bicycle generally in an upper region of its frame. Examples of this type of bicycle carrier can be seen in U.S. Pat. Nos. 5,476,202; 5,469,997 and 5,373,978. As having to attach clamping components, typically fall bike weight supporting clamping components, to the more susceptible painted frame regions of bicycles is undesirable, carriers that attach to a rear end of a vehicle also include carriers that are not designed for attachment to the upper or internal frame structure of a bicycle or other wheeled appliance, but are designed for providing an underlying platform on which the bicycle can be positioned. Prior art examples of this latter type of bicycle carrier include, for example, U.S. Pat. Nos. 5,025,932; 5,377,886; 5,497,927; and 5,570,825. While these type of carriers avoid the drawback of having attachments extending near or in contact with the bicycle's upper, interior frame structure, they generally suffer from a plurality of other problems, such as being (1) highly complex in design; (2) not very versatile from the standpoint of being able to accommodate for variations in the desired number of bikes (e.g., motorbikes or bicycles); (3) not able to accommodate a large number of bikes; not well suited for ease in loading (e.g. difficult wheel or fork latching or the positioning of handle bars of multiple bikes at a common level, conflicting relationship); (4) bulky to the extent of presenting difficulties from the standpoint of, for example, shipping, retailer shelf space requirements and high customer handling weight; and/or (5) formed of a large number of unique components making for high manufacturing and purchase costs as well as difficulty in customer assembly.

SUMMARY OF THE INVENTION

The present invention is directed at providing a carrier device that is directed at avoiding or alleviating the various problems described above as being associated with the prior art. The present invention features a carrier device, which, in one preferred embodiment, is a bike carrier that is suited for attachment to a rear end of a vehicle such as by way of a hitch, tow ball platform or bumper attachment. A preferred embodiment of the present invention features a modular carrier structure that is interconnectable with other carrier structures to form a carrier assembly with the modular carrier structures preferably being arranged in a vertically stacked or staggered arrangement as they extend out away from the rear end of a vehicle. The vertical stacking arrangement provides the advantage of being able to retain an underlying bike support relationship while avoiding having the clearance level of the rearmost bike supporter subject to scraping during certain vehicle travel conditions (e.g., steep driveway aprons or rough terrain such as that often faced during off-road travel). Thus, because of this modular stacking arrangement, a large number of bikes can be carried (e.g., 4) while avoiding scraping problems. In addition, the vertical stacking arrangement positions the handle bars of many bike at alternate levels so as to avoid loading and unloading conflicts. Loading and unloading conflicts are also easily avoided under the design of the present invention by facilitating an alternate placement of each bike on each carrier.

A preferred embodiment of the present invention also features a modular arrangement wherein a user/customer can choose the number of individual carriers (preferably each a self-contained one bike carrier) desired. For example, a single person may wish to purchase just a single, self contained modular carrier structure and not incur the expense of a multi-support carrier and yet also wish to keep the option open for later expansion. A couple on the other hand, may prefer to purchase two modular carrier structures (one attached to the vehicle and the second attached to the one attached to the vehicle), and yet also keep open the option for later expansion without having to discard or sell the earlier purchased modular carrier structures. Furthermore, with the modular nature of the present invention an expanding family can add on to a prior number of purchased carriers based on the exact number needed. Also, because a preferred embodiment of the invention features modular carrier structures that are the same in all respects or have the exact same design (or at least the same design for all extensive purposes) there is avoided confusion both at the manufacturing level (e.g. which product is being shipped out) and at the customer level (avoiding having to return items because the purchased item was not the one intended). In addition, the preferred modular carrier support of the present invention features a highly symmetrical arrangement wherein all or essentially all of the components attached to a central element are in same design pairs and mutually useable on either side (making for high efficiency manufacturing and also ease in customer assembly once purchased).

The present invention also has the advantage of being able to have a compact break down arrangement which is beneficial from the shipping container and storage requirements (particularly from the standpoint of a retailer shelf storage requirement which is at a premium). The arrangement of the present invention is also able to provide the numerous advantages described above while avoiding the introduction of a large number of components, particularly a large number of different designed components, which again avoids many of the manufacturing, assembly and use difficulties associated with the prior art.

The present invention also provides a design that allows for rapid loading and unloading of one or a large number of bikes (e.g., 4) while still providing high stability and position maintenance assurance to the user. This is particularly true following the initial sizing of the carrier wheel cradles (which in itself is easy to achieve under the present invention) wherein the user can simply insert and remove the bike from the preadjusted cradle(s) without having to further manipulate the preset cradle position. A preferred embodiment of the invention also includes an easy to perform tie down assembly which relies on the underlying modular carrier structure(s), preferably eye-loop bolts joining together components of the carrier) for quick attachment of a single tie down strap while avoiding the placement of any buckles or the like that can lead to scratching of a bike's painted outer coating.

An alternate arrangement of the present invention features a modular carrier with a first wheel hold or placement device at one end, an intermediate support device and preferably, a second wheel placement device. One embodiment of the invention features a cradle as the second wheel placement device; a hold down strap device as the first wheel placement device and an intermediate support device comprising a support post which supports a bike frame contact member preferably in the form of an angled support neck that has a low friction abrasion angle cap such as a plastic angle cap supported within the correspondingly angled support neck. For further tie down enhancement, the angled support neck comprises tie down strap reception slots and a tie down strap threaded therethrough for tie strap wrapping about the typically lower, sloped frame bar of a bike. Moreover, the bike frame contact member is preferably made adjustable with respect to the support post such as by way of a bolt/flat plate combination. The support post is preferably releasably secured in position on the remainder of the bike carrier such as by way of a bottom base plate with a bolt aperture for receiving the bolt which secures a side rail to the carrier extension support.

One of the preferred embodiments of the present invention features a carrier device comprising a first modular carrier structure having an extension support which includes, at a first end, means for connection with a vehicle and first modular member connection means, and having at a second end second modular member connection means. The modular carrier structure also preferably includes means for supporting an object to be carried such as a rail assembly for below support of the wheels of a bike or the like. The means for supporting an object such as a bike includes a first brace connected with said extension support and a side rail structure to which the brace is attached. The first brace is preferably a first bridge brace having a central portion connected to said extension support and more external sections connected to an under surface of said side rail structure. In addition, in one embodiment of the invention the means for supporting includes a second bridge brace having a central portion connected to said extension support and more external sections connected to an upper surface of said side rail structure. Further, in a preferred embodiment of the invention, a common bolt extends through the bottom base plate of the support post of the intermediate support device, the corresponding external section of the upper bridge brace, through the side rail structure, and then through a corresponding external section of the lower bridge brace.

Each bridge brace is, in one embodiment, a centralized bridge brace structure in that said external sections thereof each extend less than 4 inches out from an adjacent most side section of said extension support. With this type of bridge structure the side rail structure includes a first side rail and a second side rail, with the first side rail having an internal end juxtaposed to said extension support and sandwiched between above and below positioned external sections of said first and second bridge braces, and said second side rail has an internal end juxtaposed to said extension support and sandwiched between above and below positioned external sections of said first and second bridge braces. The first and second side rails also have a common design and are in contact or within $\frac{1}{8}$ of an inch of contact with respect to said extension support. Preferably the upper and lower bridge braces have a common design. The extension support also preferably includes a set of aligned holes and said bridge braces include apertures positioned for alignment with said set of aligned holes in said extension support, and said carrier device further comprising a connector that extends through each hole of said set of aligned holes and within each of said apertures of said bridge braces. The support post of the intermediate support device can thus be easily switched to one side or the other of the extension support by choosing which side rail/bridge brace combination to use as the support platform for the support post.

A central bolt/nut combination is suitable for the purposes of the present invention, and each of said side rails including a set of aligned side rail holes at respective internal ends, and the external sections of said bridge braces have apertures which are positioned for alignment with vertically aligned side rail holes of a corresponding side rail sandwiched therebetween, and said carrier device further comprises connectors such as bolt/nut combinations which extend through respective vertically aligned sets of the side rail holes and within the apertures of corresponding above and below bridge braces. As noted above, in the embodiment featuring a vertical, intermediate support device for contact with a bike component other than the wheels such as contact with the underside of the typically lower sloped frame section of a bike (extending from the handle bar support post to the crank case hub), the base plate of the support post can be secured to the upper bridge brace's external wing section by the same connector that extends through holes in the side rail to secure the bridge brace and support post to the side rail/extension support combination.

A carrier device of the present invention also includes a first bike holding member and a second bike holding member supported by respective side rails to opposite sides of said extension support, and wherein said first bike holder is adjustably supported on one of said side rails and free to slidably adjust from an external end of said one of said support rails to said bridge braces. The first bike holder is free to slide along said one of said support rails from a free end thereof to a location at least 4 inches from said extension support without obstruction with respect to the bike carrier in a fully assembled state. The second bike holder is adjustably supported on an oppositely positioned one of said two side rails so as to be freely slidable from a free end of said oppositely positioned one of said two side rails to a location at least 4 inches from said extension section without obstruction.

In one embodiment of the invention, each of said bike holding members preferably includes a V-shaped bar cradle having a pair of legs extending off from a corresponding pair of base extensions, and said base extensions being supported by a sliding member designed for side rail sliding contact, and said holding members including a fix-in-position device for precluding movement of said sliding member, and said V-shaped bar section extending at a greater angle outward of a vertical plane than that assumed by said base extensions. An alternate embodiment of the invention, which is particularly suited for use with a bike hold down means that includes the aforementioned intermediate support device, features a first wheel placement device in the form of a flexible hold down device such as a strap with strap locking means such as a buckle, clasp, or VELCRO™, hook and loop fastener. The flexible first wheel placement device is particularly suited for use with the V-shaped, angled neck support of the intermediate support device as the latter provides a degree of lateral support like a wheel cradle, and yet, the strap is easy to position and fix in the desired position in a wrapping arrangement about the wheel of a bike.

An alternate embodiment of the invention features a second modular carrier structure having an extension support which includes, at a first end, means for connection with a vehicle and first modular member connection means, and having at a second end second modular member connection means. The second modular carrier structure also includes means for supporting an object to be carried. The second modular carrier structure is connected, through use of its first modular member connecting means and the second modular connection means of said first modular carrier structure with the first modular carrier structure in a vertically offset arrangement wherein the extension support of said second modular carrier structure has an upper surface above an upper surface of the extension support of said first modular carrier structure. Preferably the lower surface of the second modular member is flush with an upper surface of the first modular carrier structure when assembled together.

The extension support of each of said first and second modular carrier structures is preferably a tubular member and the means for connection to a vehicle for each of said first and second modular carrier structures includes a first set of aligned holes, and said first modular member connection means of both said first and second modular carrier structures includes a respective set of aligned holes, and said second modular member connection means of both said first and second modular carrier structures also includes a respective set of aligned holes, and a connector is designed to extend through the aligned holes of the first modular connection means of the second modular carrier structure and through the below positioned aligned holes of the second modular member connection means of said first modular carrier structure. Also the first and second modular carrier structures are interchangeable and of the same design with respect to which one connects to the vehicle and which one connects to the modular carrier structure connected to the vehicle. In one embodiment of the present invention the connector connecting the first and second modular carrier structures also extends through the central region of the bridge braces of the first (below) carrier structure directly supported by the vehicle. In view of the multi-purpose functioning of this connector (e.g., a fastener for the upper and lower bridge braces of the first carrier structure as well as the upper and lower arranged stacked modular carrier structures, the connector is sized rather substantially (e.g., a 5⅛×3½" bolt with corresponding washer and nut). When a single modular carrier device is all that is needed then the aforementioned connector is used only to secure the bridge brace(s) to the extension support. In this way, a connector is readily provided when switching from a single modular carrier structure mode to a multi-carrier structure mode.

In addition, under the present invention, it is preferable to have bikes stacked in an alternating front-back relationship in going out from the first supported bike closest to the vehicle. The arrangement of the present invention is well suited for handling this alternate positioning of a plurality of bikes. For example, in the bike hold down means of the present invention, there is included a first wheel placement device (such as a hold down strap, an intermediate support post device and a cradle) with each being readily releasable for relocation (or readily initially positionable) to assume the desired location. That is, the strap and cradle are easily positionable on either of the opposite side rails and to essentially any position along the side rail length by simple manipulation of the respective locking device. Also, the intermediate support device with support post and height adjustable angle neck can easily be switched from one side rail to another simply by fastening its base to the desired bridge brace wing extension through use of the corresponding wing extension connector. In this way the first centralized support post is positioned to one side of the double stack modular carrier structures while a second is positioned to the opposite side as the first. The same thus being true with respect to the straps and cradles.

A carrier device is also featured in the present invention which includes a third modular carrier structure of a common design as said first and second modular carrier structures and said third modular carrier structure being arranged so as to be vertically offset from said second modular carrier structure upon said third modular carrier structure being interconnected with said second modular carrier structure. In addition, when using an intermediate support device, the first and third modular carrier structure would have the same intermediate extension support position, while the second modular carrier structure would have an opposite side intermediate support device position. A fourth modular unit can also be added to the third in the same manner as described above with respect to the second modular carrier structure to the first with the fourth having the same intermediate support device position on the second. In this way the carrier structures can be attached such that said second modular carrier structure assumes a stacked, vertically offset relationship with respect to said first modular carrier and so on outward depending on the number of carriers added on.

The invention also features a carrier device for supporting bikes that comprises a first modular carrier structure having a bike support platform, a second modular carrier structure having a bike support platform, and means for releasable interconnection of a forward end of said second modular carrier structure to a rear end of said first modular carrier structure such that said second modular carrier structure is positioned vertically above and offset with respect to said first modular carrier structure.

Also, the first and second modular carrier structures preferably each include centrally positioned extension supports, and the extension support of the second modular carrier structure is laid on top of a rear portion of the extension support of said first modular carrier structure, and said means for interconnecting includes a connection member which extends through each extension support so as to lock said extension supports in a stacked relationship.

The present invention also features a bike carrier device that comprises an extension support, and a side rail structure supported by said central extension support and having side rail sections extending to opposite sides of said extension support and each of said side rail sections being in contact with said extension support. There is included a pair of wheel cradle assemblies positioned on said side rail structure on opposite sides of said extension support and at least one of said cradles being adapted for slidable adjustment on a respective, supporting side rail section. Also, at least one of said wheel cradle assemblies including a releasable fix-in-position device for fixing a corresponding one of said wheel cradle assemblies in a desired position on said side rail structure. The releasable fix-in-position device also includes a wheel hold down device which includes a flexible member pinched between said cradle and a supporting one of said slide rail upon said fix-in-position device being in a locked state. The wheel hold down device also includes a flexible strap with loop adjustment and securement means that enables the strap to be opened, wrapped around a wheel and secured in a hold down state. In one embodiment, the wheel hold down device is a strap used alone to hold one wheel down in place of a second cradle while an opposite wheel cradle is still used on the other wheel. In addition, there is preferably provided a more centralized vertical post with bike frame securement member (preferably in the form of an angled V-shaped neck with a corresponding V-shaped plastic frame protection insert and a corresponding (additional) frame hold down strap). The flexible member in each embodiment, is preferably a nylon strap with securement means for fixing one section of the strap to another section so as to form a wheel locking loop. Preferably, the pinching cradle structure includes a V-shaped section and a pair of base sections, and said V-shaped section extends from vertical at a first angle between 30 and 60 degrees and said base sections extend at 0 to 10 degrees with respect to a vertical plane.

Thus, one embodiment of the present invention features a bike carrier that includes an extension support having a vehicle support end and a second end as well as a side rail structure supported by the extension support. The side rail structure has a first section extending to a first side of the extension support and a second section extending to a second side of the extension support, and the first and second sections are arranged for supporting a respective wheel of a bike when in use. The carrier device also includes a first wheel hold down device positioned on the first side of the extension support and an intermediate support device supported by the extension support (e.g. either directly or indirectly such as via an intermediate side rail section) so as to contact a frame component of the bike when in use. The intermediate support device has an upper frame contact section that is positioned, when is use, for contact with the lower sloping frame component of the bike which extends to the hub typically. The upper contact section includes a sloped neck section which includes a frame reception recess of a slope generally (within, for example, 10 degrees) corresponding to that of the sloped frame section received in the recess. A frame hold down device such as a strap is threaded through the neck section for wrapping around the sloped frame section of the bike. The intermediate support device is also preferably adjustable in height by way of a position adjustment device that allows the upper contact section to be adjusted with respect to a lower support post section of the intermediate support section and fixed in position by said position adjustment device at a desired bike frame contact height. In addition to the intermediate frame contact device and the first wheel hold down device (which is preferably in the form of a cradle slideable along the rail structure) a second wheel hold down device such as an independent strap is provided for the second wheel with the strap being readily wrapped and removed following the securement of the frame and either the prior sliding of a wheel into the cradle or the sliding of the cradle to the wheel after frame attachment. The invention also feature a bike carrier assembly having first and second modular carriers which have the same structure or substantially the same and are readily interchangeable between a direct vehicle support position or an indirect vehicle support position wherein the non-directly support modular carrier structure is staggered upwardly and secured to the back of the free end of the direct vehicle supported carrier structure. In one embodiment a common connector connects the first and second modular carrier structures while also securing in position a side rail supporting brace. The base of the intermediate support device is also preferably secured in position by way of a connector that is used to secure one of the side rails to one side of a bridge brace supported by the extension support. The intermediate support device can thus be easily switched to opposite sides of the extension support by use of different wing sections of the bridge brace.

BRIEF DESCRIPTION OF THE DRAWINGS

FIG. 2 shows a perspective view of one of the two cradles shown in FIG. 1.

FIG. 3 shows a perspective view of the support extension of FIG. 1.

FIG. 4 shows a perspective view of one of the two bridge braces shown in FIG. 1.

FIG. 5 shows a perspective view of one of the two support rails shown in FIG. 1.

FIG. 9 shows a perspective view of a pair of the modular carrier structures of FIG. 8 interconnected with one another and with the second added modular carrier structure shown in dotted lines to illustrate the optional nature of adding on modular carrier structures to a more internal positioned modular carrier structure with respect to a supporting vehicle or the like.

DETAILED DESCRIPTION OF THE PREFERRED EMBODIMENTS

Figure 1:
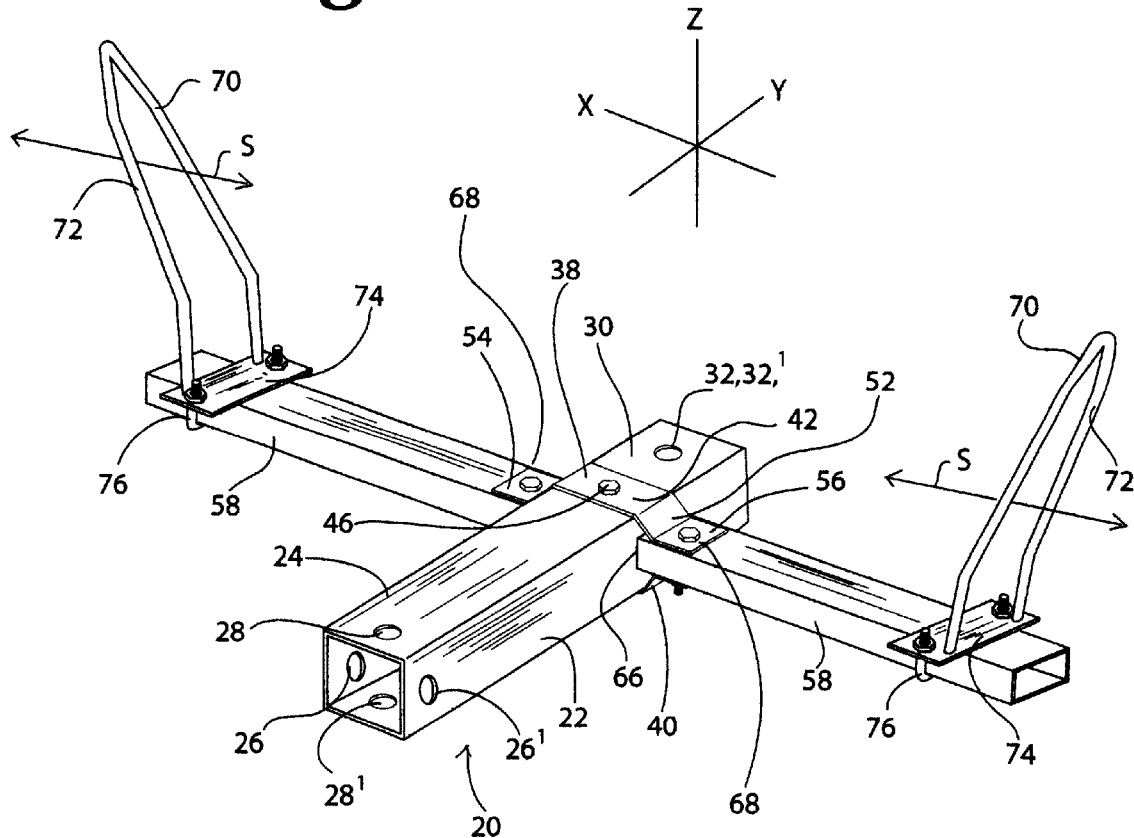
FIG. 1 shows a perspective view of a carrier device of the present invention which in this figure is a modular carrier structure.
Figure 6:
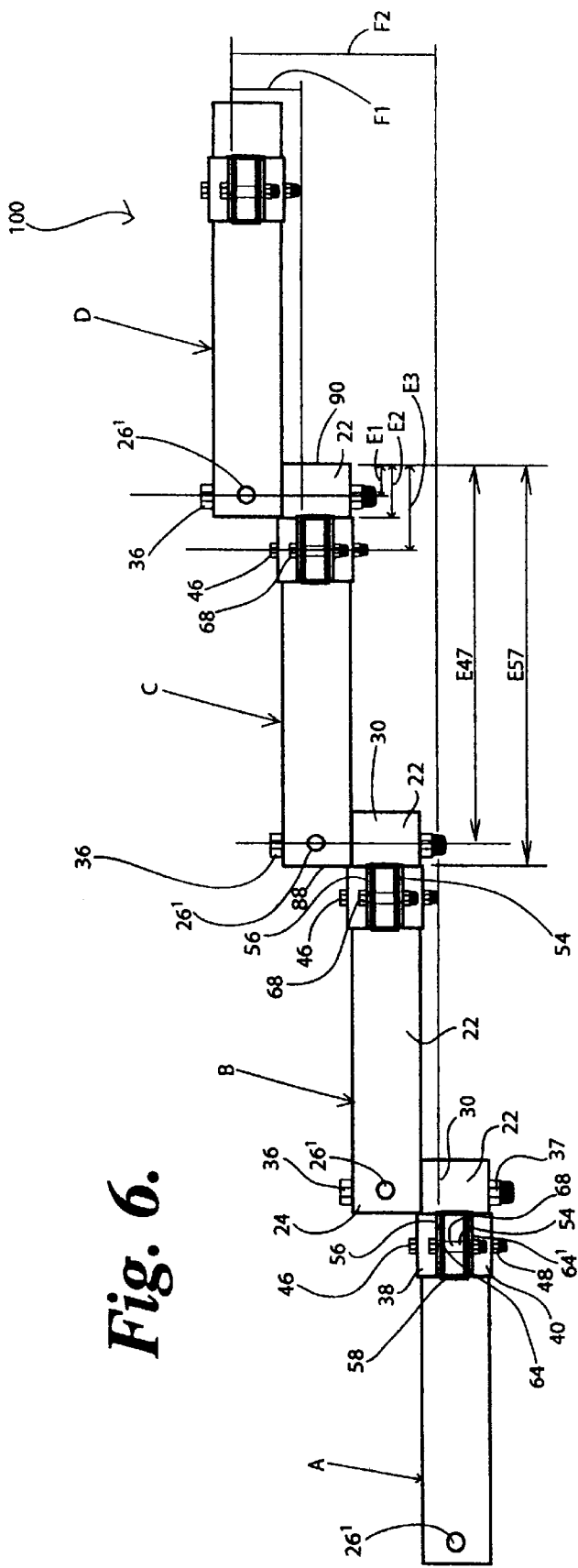
FIG. 6 shows a side elevational view of a plurality of interconnected modular carrier structures with the cradles removed.
Figure 7:
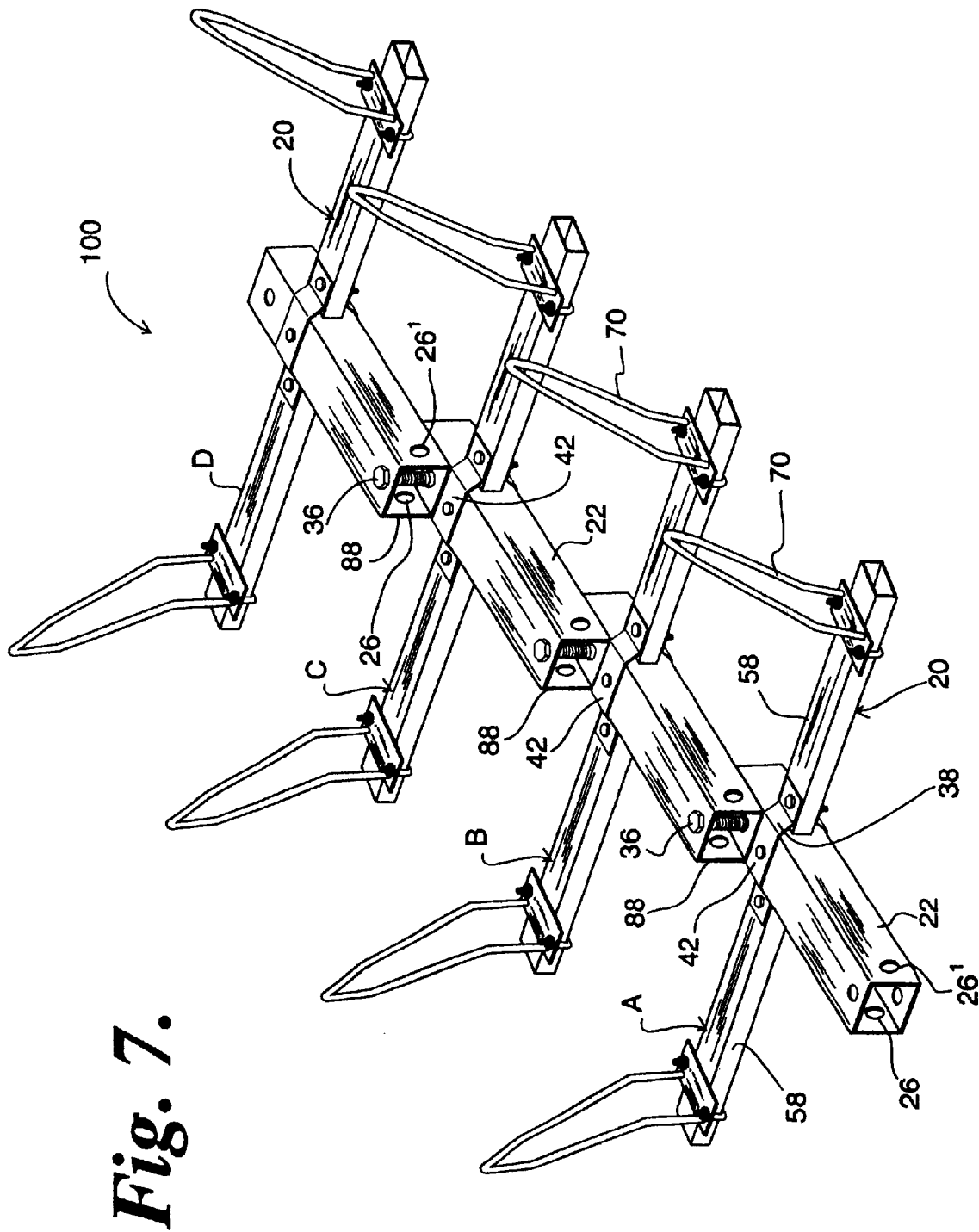
FIG. 7 shows a perspective view of that which is shown in FIG. 6 except with the cradles shown in FIG. 1 included for each modular carrier structure.

FIG. 1 shows a perspective view of modular carrier structure 20 of the present invention which in the illustrated embodiment features extension support 22. Extension support 22 is preferably a tubular member having, at interior end 24, two sets of aligned holes. The first set features horizontally aligned holes 26,26' which are sized to receive a clevis pin or the like for locking extension support 22 following a telescopic insertion within a reception cavity of a vehicle trailer hitch or the like (see FIG. 10 for an example of a square hitch attachment). Extension support 22 can also have a variety of alternate vehicle attachment means so long as such attachment means provides a high level of stability and extension support securement to the carrier device. The second set of holes 28,28' is vertically aligned for use in interconnecting with another modular carrier structure having the same configuration or a similar configuration as discussed in greater detail below. The opposite or exterior end 30 of extension support 22 features a second set of vertically aligned holes 32,32' (only the top hole being shown in FIG. 1, but it being understood that a bottom hole is aligned therewith as shown at the opposite end of support 22 with respect to holes 28,28'). Vertically aligned holes 32,32' are designed for alignment with holes 28,28' of another modular carrier structure to achieve a stacked arrangement of modular carrier structures as shown in FIGS. 6 and 7 and as explained in greater detail below.

As can be seen from FIG. 3, between the two sets of vertically aligned holes (28,28' and 32, 32'), there is positioned, in one embodiment of the invention, a third set of vertically aligned holes 34,34', which third set is preferably positioned closer to hole set 32,32' than set 28,28' to provide a sufficient degree of extension clearance from either the bumper region of the vehicle or a more internal one of a plurality of the stacked modular carrier structures. Under the present invention there can also be provided a series of spaced pairs of vertically aligned holes along the length (or a portion of that length) for providing for variations as to the degree to which a more external tube is spaced from a more internal tube once telescopically arranged as explained in greater detail below, including the possibility of the use of hole set 32, 32' as one of the sets in the series or the use of set 32, 32' alone. With this arrangement the most internal tube can be positioned to extend out away from the vehicle in a maximum extension setting while more external tubes can be less extended if a more compact arrangement for supported bikes or the like is deemed desirable.

While a variety of sizes and dimensions and materials are considered suited for use under the present invention, a 2"×2" hollow tubular member formed of a relatively heavy gauge steel material (e.g. 13 gauge steel which has a thickness of about ⅛ of an inch) represents some of the preferred characteristics for extension support 22. Extension support 22 also preferably has a longitudinal extension length of about 6 to 18 inches with 12 inches being preferred. The first and second sets of holes (28,28' and 32,32') are preferably spaced such that each hole's edge is at least ½ inch inward of a respective end edge of tubular extension support 22 and more preferably from ½ inch to 2 inches of that edge to ensure sufficient strength to withstand the forces which develop when a clevis pin for use with a vehicle trailer hitch or a modular interconnector bolt such as that represented by reference number 36 in FIG. 6 is inserted through the aligned holes (28,28' and 30,32'). Also, when utilized, the location of the third set of vertically aligned holes 34,34' preferably falls closer to the second set of vertically aligned holes 32,32' than to the first set of vertically aligned holes. For example, when considering the total distance between the central points of the first and second sets of vertically aligned holes as representing 100%, a preferred location for the third set of aligned holes is within the region extending 50–95% with the 0% point being the center point of the first vertical set of aligned holes. A range of 75–85% is even more preferred with 80% being the most preferred. For example, a 12 inch length for extension support 22 with each set of vertically aligned holes (28,28' and 32,32') having a center point 1 inch from the respective closest edge, and the third set of vertically aligned holes 34,34' having a central point 2 inches from that of vertically aligned holes (32,32') and thus 3 inches in from the closest extension support edge. A range of 3 inches from the closest edge is also representative of a preferred range when a single set of holes is used for both bridge brace locking and carrier to carrier locking.

The horizontally aligned holes (26,26') are preferably centered on the tubular side walls of extension support 22 so as to have a central point one inch from the top and bottom surfaces of extension support 22. Also, the sets of aligned holes 28,28' and 26,26' preferably fall on a common cross-sectional plane although a staggered arrangement (e.g., within 2 inches to or, more preferably, within 1 inch) is also a feature of the present invention for added strength particularly when using a thinner wall design or a tube with smaller dimension (e.g. a 1¼ inch square tube to suit the smaller 1¼ square hitch size found on many vehicles rather than the also common 2 inch square hitch size).

FIGS. 1 and 6 further illustrate upper bridge brace 38 and lower bridge brace 40, which are preferably one in the same and arranged in mirror image fashion. FIG. 4 is thus illustrative of both upper and lower bridge braces 38,40. As shown by FIGS. 1 and 4 each bridge brace 38,40 features an extension support contact section 42 which conforms to the supporting or contacting surface of extension support 22. For example, with the preferred 2"×2" tubular arrangement for extension support 22, contact section 42 has a corresponding contact surface length (extending transverse to the longitudinal extension of support 22) of 2 inches. Each bridge brace also features aperture 44 provided in a central region of contact section 42 for alignment with a receiving set of vertically aligned holes (e.g., 34,34' and for 32, 32'). Thus with both the upper and lower bridge braces in position with respect to extension support 22, intermediate bridge bolt 46 (or any other suitable interconnecting member) is free to pass through the upper bridge brace's central aperture 44, the set of aligned holes (e.g., 34,34') in extension support 22 and the lower bridge brace's central aperture 44. Threaded nut 48 or some other type of fixing means is used to place the two bridge braces in a compression or at least an interlocked relationship with respect to the tubular extension support therebetween. Intermediate bridge bolt 46 is shown in FIG. 6 as extending through both of the preferably ⅛ inch thick steel bridge plates and the 2 inch tubular extension support 22 and thus intermediate bolt 46 is preferably a ½ inch or so greater in length to provide room for nut 48 (e.g., a 2.75 inch long bolt of ⅝ inch diameter). With the preferred tubular nature of extension support 22 it would also be possible to use a pair of nut-shorter bolt combinations to hold the respective upper and lower brace bridges to the extension support.

Each bridge brace also features left and right sloping extensions 50,52 extending out to opposite sides of contact section 42 (e.g. 30–60° and preferably 45° to the horizontal) for a relatively short distance of, for example, about ½ inch to 1 inch and also down for ½ inch when a 2"×2" extension support is used and a 1"×2" side rail 58 (FIG. 5) is involved. Extending farther out from the respective external ends of sloping sections are side rail contact sections 54 and 56 shown to be extending along a common horizontal plane which is parallel to that assumed by extension support contact section 42. Apertures 60 and 62 are provided in a central region of side rail contact sections as best shown in FIG. 4. The above described arrangement for bridge braces with the sloping sections represents an easily formed structure and thus is preferable from that standpoint although other designs are possible including, for example, a bridge brace featuring a planar central contact surface, transverse (vertical) legs from which extend the side horizontal side rail contact sections.

With reference to FIGS. 1 and 5, modular carrier structure 20 features two of side rails 58 with each preferably being the same hollow, tubular member (e.g. formed by extrusion) and preferably also formed of the same gauge steel material as that of extension support 22. Thus, in addition to the two clamping bridge braces attached to the central extension support being identical to each other, the two side rails are identical with each other and hence the interconnecting bolts are the same as well. This makes for highly efficient manufacturing and assembly (either by customer or upstream in the distribution flow). The side rails 58 shown in FIG. 1 are also preferably of a 1"×2" cross section with the longer side extending in the same longitudinal direction as the longitudinal extension of extension member 22. The length of side rail 58 is preferably from 15 to 30 inches with this range being well suited for the support of the wide variety of different standard bike sizes which support represents the preferred use of the modular carrier structure of the present invention (e.g., with the use of proper thickness and/or material for the above described other devices can be supported by the carrier of the present invention including, for example, dirt bikes, mopeds, scooters, etc.). A preferred length of side rail 58 is 23 inches such that the total transverse extension is 2 times the side rail length plus the preferred 2 inch transverse width of extension section 22 as the interior end edge 66 of rails 58 are in a flush contact relationship with respect to the side walls of extension section 22. FIG. 5 also illustrates that side rail 58 features a fourth pair of vertically aligned holes 64,64' provided close to the planar interior end edge 66 of side rail 58 (e.g., the center of holes 64,64' is within 1 to 4 inches of edge 66 with 1.5 inches being preferred). While even longer length side rails are possible, a maximum extension of 62 inches or less in the transverse direction is preferred as that is compatible with many common vehicle sizes used to support the carrier of the present invention.

As shown in FIG. 1, upper and lower braces 38,40 are preferably dimensioned to lock in place the left and right side rails 58 shown in FIG. 1 at a central or intermediate location along the side walls of extension support 22. This locking function is achieved by the insertion of a locking member such as bolt-nut combination 68 which extends through the upper plates' respective side rail contact section (56,54), through the aligned holes 64,64' and then through the opposing side rail extension (54,56) as best shown in FIG. 6. Thus, the upper and lower braces and locking bolts 68 provide clamping or interconnection means to both place and hold rigidly end edge 66 of rail 58 in a flush, abutting relationship such that the intermediately positioned left and right side rails are precluded from rotation about a vertical axis (an axis parallel with the illustrated Z axis in FIG. 1) while the intermediate bridge bolt precludes any sliding of the upper and lower braces (and secured side rails 58) along the illustrated longitudinal or Y axis direction extending along the elongated length of extension support 22. The bridge braces also function to prevent rotation of side rails 58 either with respect to a Y-axis pivot axis or an X-axis pivot axis (e.g., both through the extra support of the interconnected braces as well as their positioning of the interior ends of side rail 58 with the side walls of support 22). The above described abutment relation includes both an initial assembly abutment or a small spacing (less than an ⅛ inch) which results in a rapid abutment relationship upon a small amount of relative shifting of the side rails' interior end with respect to support 22, although an initial or at assembly flush relationship is preferred.

FIG. 1 includes an illustration of two cradle assemblies 70 provided on the outer ends of the left and right side rails 58. Cradle assembly 70 comprises holding member 72, slide plate 74 and U-bolt 76. FIG. 2 shows in greater detail holding member 72 and slide plate 74. Holding member 72 is preferably in the form of a single circular cross-section rod or bar which is configured to have upper V-shaped section 77 with a pair of parallel base extensions 78,80 extending from the ends of the spaced apart legs of the V-shaped extension. The lower end of the parallel base extensions 78,80 is rigidly secured to slide plate 74 preferably by way of a weld. The spacing apart along slide plate is represented by "w" which is preferably about 2.5 inches. Slide plate 74 (which preferably is a 3.25×2 inch plate) features U-bolt reception holes 82, 84 (or alternatively open edge notches in view of the configuration of a U-bolt 76 providing sufficient securement). Slide plate 74 preferably is sized along a Y-axis direction so as to cover the upper surface of extension support 22 and extends transversely out far enough on each side to accommodate the vertical legs of the U-shaped bolt.

FIG. 2 further illustrates a preferred configuration for holding member 72 with its V-shaped section 77 being sloped outward along the X-axis at angle θ (preferably falling within the range of 30 to 60° and more preferably about 45°) with respect to the Z-axis and V-shaped section defines angle a which preferably falls in the range of 10 to 35° with an angle of 25° being preferred. The base extensions 78, 80 are preferably less angled than the V-shaped extension (e.g. vertical (0°) to 10°) with the vertical being the more preferred. In a preferred embodiment of the invention, height H1 represents the maximum vertical height of V-shaped section 77 off from a plane lying flush on the top surface of the typically ⅛ inch thick slide plate 74 up to the V-shaped section's apex. Height H1 preferably ranges from 10 to 30 inches with 18–20 inches being the more preferred height which is well suited for providing a generally universal wheel reception configuration. Length L1 represents the length which the combination of the V-shaped section and base sections run outward along the X-axis to a point of intersection with the lower end of height H1. The preferred value for L1 is 8 to 16 inches with 13 inches being the more preferred. H2 represents the preferred height for the vertical rise value of the upper end of base sections 78 or 80. The preferred height H2 for base sections 78,80 is about ¼ to a ⅓ of that of H1 (e.g., a range of 2 to 8 inches with 3 inches being a particularly well suited height for H2). L2 represents the X-axis run corresponding to the X-axis run for just the V-shaped section 77. While L3 illustrates the X-axis run for base sections 78 and 80 such that L1–L2=L3. With the base extensions 78,80 extending only vertically, the length L1 would be equal to L2 and L3 would equal 0.

The above described configuration of holding member 72 is advantageous from the standpoint of providing an improved hold-in-position function with respect to the wheel of a bicycle or the like in that the combination of the close to or at vertical orientation of the base extensions and the outward sloping V-shaped section allows the holding member to position a relatively large percentage of its contact surface close in toward the central region of the wheel with the point of tire abutment with the notch of the V-shaped section 77 representing the limiting factor of how close in the interior of bar member 72 can be positioned with respect to the frame of the bicycle. The angle for the V-shaped notch of the V-shaped section is designed to provide a great deal of bike position control due to the pinching nature of the notch without causing tire or wheel damage and/or causing the wheel to make contact at a location on the bar which is not near or at its apex. The V-shaped section can also be provided in a variety of angle sizes to accommodate the intended use. For example, mountain bikes typically have larger tire widths than touring or racing bikes while motor bikes have even large tire widths. The above no noted angle of 25° represents an angle well suited for a wide variety of various style bike tire sizes.

An advantageous feature of the present invention is its ability to accommodate a wide variety of bike sizes despite a preferred embodiment also being highly modular in nature. That is, the design of the present invention includes the ability to have a single carrier snugly accommodate a large variety of different height and length bikes (e.g. adult and children size bikes). This versatility is partly due to the ease with which cradle assemblies 70 can be shifted along respective side rails 58 which, in this context, can be considered as slide rails. Upon loosening one (or both) nuts associated with U-bolt 76, the smooth, planar underlying surface of slide plate is easily slid along slide rails 58 as represented by slide direction S for each of the illustrated cradle assemblies 70 shown in FIG. 1. In this way an operator can loosen either a single one or both of cradle assemblies of a single carrier 20 with a bicycle positioned therebetween and slide one or both of the cradle assemblies until the bicycle is placed in a snug, held-in-position state upon a lock down of the cradle assemblies (or assembly if only one was loosened for adjustment). The operator can also transversely stagger the bicycles with respect to a multiple interconnected set of modular carriers if this helps in removal and/or reinsertion of the bikes. Also, once a particular sized bike is accommodated, adjustments would not always be a necessity for future reinsertion. While a loosening of the nuts for the U-bolt clamps described above is easily accomplished with a wrench or the like, a non-tool clamping means is also contemplated for use in the present invention.

Figure 2A:
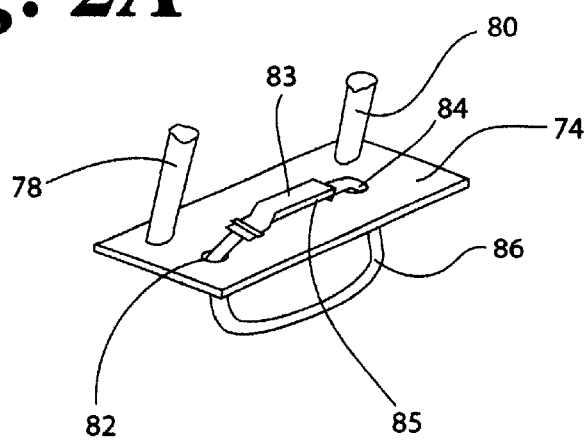
FIG. 2A shows in cut-away an alternate embodiment of a cradle assembly with quick release slide plate clamping means.

An example of one possible "non-tool" clamping means is shown in FIG. 2A wherein instead of a U-bolt clamping means an over-center latch assembly 83 which includes over-center latch 85 such as of the type used on ski-boots with flexible metal cable 86 attached to the respective ends of latch 85. To avoid cable abrasion and/or increase the holes can have a smoothed, curved interior reception recess or a suitable low friction grommet (not shown) or the like can be provided in holes 82 and 84 and/or a low friction cable sheathing can be relied upon.

The dual cradle type arrangement described above represents one preferred bicycle holding means of the present invention in that it provides a sufficient bicycle positioning holding function particularly when supplemented with a strap hold down arrangement like that described below and/or a dual bicycle interlock mechanism. Alternative hold down mechanisms are also possible such as one of the various conventional direct fork attachment arrangement such as that described in U.S. Pat. No. 5,377,886 to Sickler. Such direct fork attachment devices, however, are less preferable from the standpoint that it is more time consuming to load, unload and have the bicycle in a ready to rate state. In addition, finding a proper storage location for the released wheel also adds undesirable complexity in the process of carrying a bicycle. Another bike (e.g., bicycle) holding means, which is highly advantageous from the stand point of good overall bike position retainment with easy initial assembly and bike attachment and detachment, is also described below in conjunction with FIGS. 17–20. This holding means features a generally centralized support device used in conjunction with one side rail wheel cradle and preferably a hold down strap in place of a second wheel cradle.

FIG. 6 shows a side elevational view of a plurality of interconnected modular carrier structures 20 like that shown in FIG. 1 to provide an alternate bike carrier embodiment represented by 100 in FIG. 6. To facilitate the discussion the cradle assemblies 70 have been removed from FIG. 6, but can be seen in the perspective view of bike carrier 100 provided in FIG. 7. Because of the modular nature of the individual modular carrier structure 20 of the present invention one, two, three, four and even more (although four is the recommended maximum for most vehicles from the standpoint of avoiding too far a shifting of gravity of the bike carrier away from the hitch vehicle attachment point) individual modular structures can be combined. FIGS. 6 and 7 illustrate four modular carrier structures 20 interconnected with the individual modular structures identified as A, B, C, and D in FIGS. 6 and 7. As illustrated in these two figures each modular member A, B, C and D is of exactly the same structure, although variations are also possible such as only A having the horizontally aligned clevis pin reception holes 26, 26'. However, the fact that each modular structure is exactly the same provides a greater degree of options to the user as well as less confusion during the time of purchase.

The similarity in each modular structure 20 also greatly simplifies the manufacturing and distribution process for the manufacturer. The modular nature of the present invention is particularly advantageous from the standpoint of allowing a purchaser to choose the exact configuration best suited for that person at the present time as well as freedom to easily modify the carrier in the event that circumstances warrant. For example, a single person may find a single modular carrier structure best suited for his or her needs, while a couple may prefer two modular carrier structures. A single child family may desire a three way combination with the potential of adding a fourth upon an increase in family size.

As shown by FIGS. 6 and 7 an increase in the number of modular carrier structures is easily accomplished by the insertion of a single connection member represented in a preferred embodiment by modular structure interconnector bolt 36 which is preferably a ⅝ inch diameter 5 inch length bolt which compresses the bottom surface of the interior end 24 of modular carrier structure B against the upper surface of the outer end 30 of modular carrier structure A. The same connection process is also carried out with respect to connecting modular carrier structure C to B as well as D to C. In addition, in the illustrated embodiment, the bottom region of the end edge 88 of each of the interior ends of tubes 22 for modular carrier structures B, C. and D is placed in an abutting relationship (preferably within direct, flush contact or, less preferably, within ¹⁄₁₆ of an inch so as to ensure contact with minimal position shifting) with respect to contact section 42 of a corresponding upper bridge brace 38. This arrangement adds to the structural rigidity of the bicycle carrier 100 by helping to prevent Z-axis rotation of a more outward modular structure member 20 with respect to a more internal one. The abutting relationship also helps in the prevention of any Y-axis shifting which lessens the stress placed on bolts 36. This arrangement also avoids having to provide structural components along essentially the entire length of rails 58 (only the preferably 1.5 to 3 inch sections 54 and 56 of bridge braces 42 extend out along the side rail and to even a lesser extent the sloping sections 50,52) which increases the bike size adjustment possibilities for cradles 70 and thus increases the versatility of the present invention.

As shown in FIG. 6, an outer modular carrier structure extends over the upper surface into contact with an adjacent bridge section a distance represented by E2 which preferably ranges from 1 to 4 inches and more preferably is about 2 inches. The central axis of bolt 36 extends through the vertically stacked structures C and D at about the half way point as represented by length E1 which under this arrangement is equal to E2/2. The central axis of intermediate bridge bolt 46 is shown in FIG. 6 to be a distance E3 from the outermost edge 90 of tube 22 which distance is preferably 2 to 5 inches and more preferably about 3 inches (or 1 inch greater than E2). Distance E4 represents the distance from the noted edge 90 to the central axis of the more internal or lower of the two modular connector bolts 36 extending through tube 22 of modular carrier structure C. Distance E5 represents the preferred length of tube 22 which, in this embodiment, is preferably 8 to 16 inches and more preferably 12. E4 is preferably a ½ inch to 3 inches less than E5.

FIGS. 6 and 7 also illustrate the vertically stepped nature of the bicycle carrier 100 made possible by the above below connection of the modular carrier structures A–D. The progressive increase in height of the modular carrier structures A–D provides the advantage of a bicycle carrier that is less prone to scraping when a vehicle traverses over a region with a sharp change in slope such as found on the road end of many driveways or over rough terrain and also avoids bicycle contact particularly in the handlebar region during loading and travel. FIG. 6 illustrates the progressive increase in height in going from one stacked modular structure by reference "F1" which is taken from the upper surface of the side rail 58 of modular carrier structure C to that of D. The upper surface of rail 58 is opted as a reference plane as that is the general location of where a bicycle tire will be in contact during travel of a supporting vehicle (depending on the wheel diameter many bike sizes will be supported instead by the slide plates of the cradle assembly). The value of F1 is preferably 1.0 to 2.5 and more preferably 2 inches (which corresponds with the preferred 2"×2" tube 22 dimensions and a standard hitch size) and to 1.25 inches which corresponds to another common hitch size. F2 in FIG. 6 represents the total step up for 3 added modular carrier structures (B–D) to the modular carrier structure secured to the vehicle (A). Thus, the preferred total step up in height F2 is preferably 3.0 to 10.0 inches with 6 inches being preferred.

Figure 8:
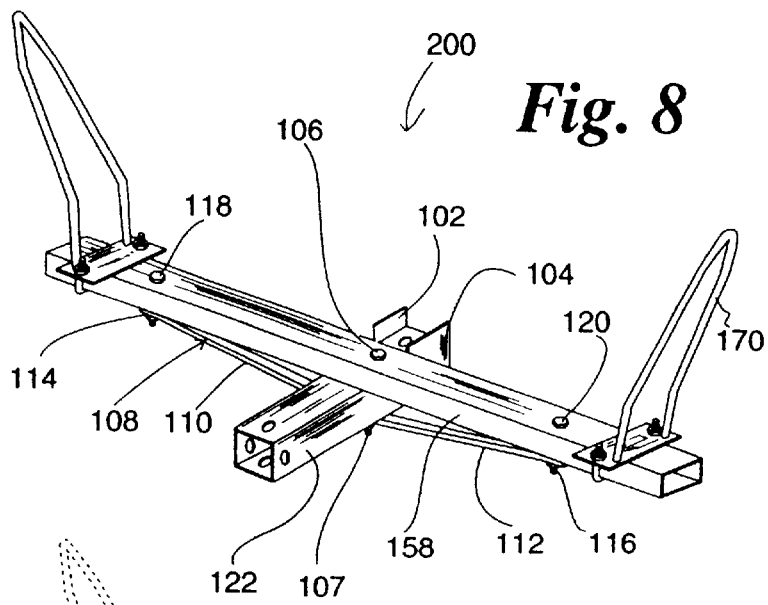
FIG. 8 shows a perspective view of an alternate embodiment of a carrier device of the present invention which is also features a modular carrier structure.
Figure 9:
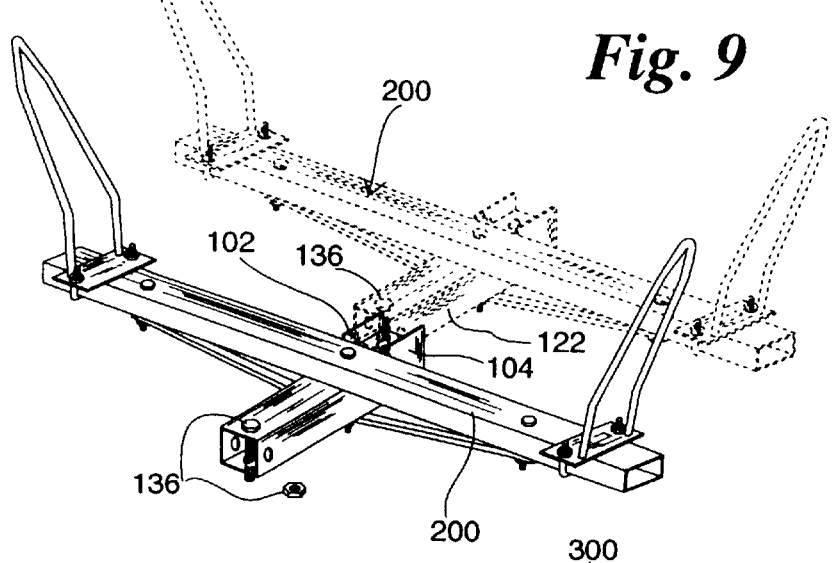
Figure 10:
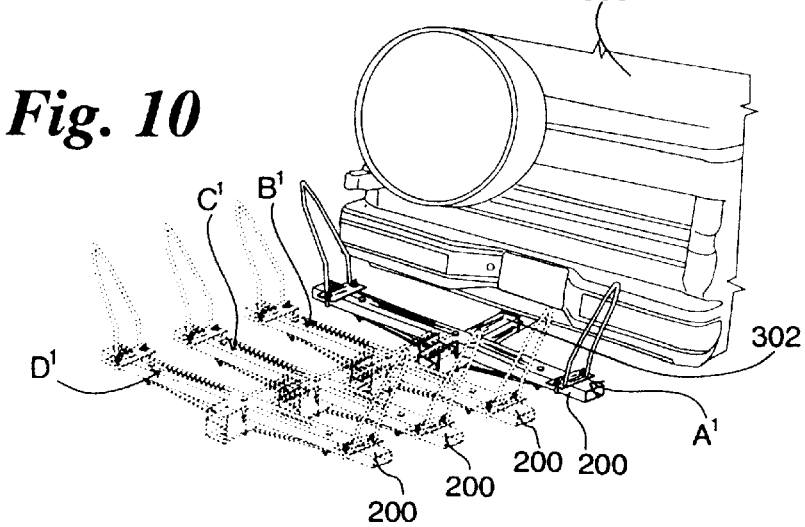
FIG. 10 expands upon that which is shown in FIG. 9 by showing in dotted lines three added on interconnected modular carrier structures to a solid line interior modular base structure as well as a supporting sport utility vehicle with supporting square hitch.

FIGS. 8–10 illustrate an alternate embodiment of the present invention which shares many similarities with that of the earlier embodiment and thus only the differences are emphasized below. With reference to FIG. 8, modular carrier structure 200 is shown as having extension support tube 122 as in the earlier embodiment. Attached to opposite sides of tube 122 at its outer end is a pair of vertical flanges 102 and 104 which are preferably welded or otherwise fixedly secured to tube 122. These flanges preferably extend about an inch up off the upper surface of tube 122 and preferably about 2 inches along the tube 122. Rather than a pair of side rails in contact with the side walls of the extension support or tube as described for the earlier embodiment, a single side rail 158 extends over and across the upper surface of tube 122 and is held in position with bolt/nut combination 106 so as to be in an abutting relationship with the interior vertical edges of the portion of flanges 102,104 extending vertically above tube 122. This relationship helps avoid Z-axis rotation of side rail 158 on a centralized basis. To provide added structural strength, bridge brace 108 is provided. Bridge brace 108 is preferably a monolithic unit with a central horizontal section 107 with an upper surface placed in flush compression relationship with the underside of tube 122 by way of bolt/nut combination 106. Brace 108 further includes sloped sections 110 and 112 that preferably have slope at an angle similar to sloped sections 50 and 52 of the earlier embodiment with 45° with respect to the horizontal being preferred. Brace 108 preferably is formed from a single bar (e.g., ¼"×1" bar) that is bent into the illustrated shape. Thus, extending out away and integral with respective ends of section 110 and 112 are side rail contact sections 114 and 116 that preferably are also horizontal and include holes for receipt of bolt/nut combinations 118 and 120.

Modular carrier structure 200 also is shown to include cradles 170 similar to cradles 70 described above for the earlier embodiment except for the plates being provided with open edge slots rather than holes. While the presence of extended bridge braces provides underneath support to the side rails in a region of 50 to 80% and more preferably 75% out from the center bolt 106, the presence of bolt/nut combinations 118 and 120 in this regions disrupt to a certain degree the freedom of cradle shifting. Thus the open notches help a user detach the cradle from the side rail to move it sufficiently inward of one of bolt/nut combinations 118,120 if a small bicycle is involved. Despite the presence of the bolt/nut combinations the degree of adjustability is sufficient to cover a wide variety of bike sizes. Also, as noted above as a person will typically retain the same bike for awhile, once the adjustment is made, the person can easily load the bike without adjustments having to be made. This is particularly advantageous with respect to a three or four bike carrier as each person in a family can have a designated loading slot on the bike carrier which is preadjusted such that the whole family's bike collection can be quickly and easily loaded and unloaded each time.

FIG. 9 illustrates a vertical stacking of a pair of modular carrier structures 200 through use of nut/bolt combination 136 having a similar size as that used in the last embodiment. As shown in FIG. 9 the flanges 102 and 104 are spaced so as to be in sliding contact or preferably at least within 1/32 to 1/8 of an inch of the corresponding side walls of tube 122 to preclude a large degree of undesirable shifting.

FIG. 10 illustrates a stacked arrangement for four of modular carrier structures 200 represented by A',B',C' and D'. As shown in FIG. 10, the tubular member 122 of modular carrier A' is telescopically received within hitch 302 of vehicle 300 and locked in place with a clevis pin as is, per se, known in the art.

Figure 11:
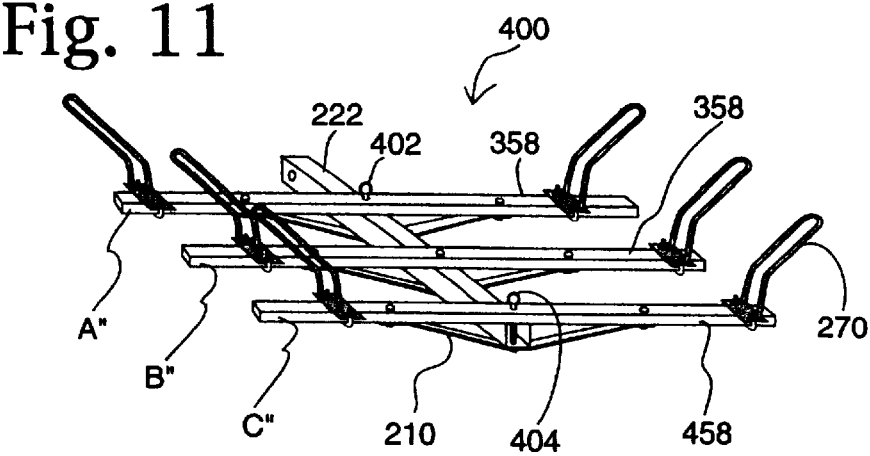
FIG. 11 shows a perspective view of a carrier device of the present invention which is a non-modular carrier device featuring a monolithic central support extension.
Figure 12:
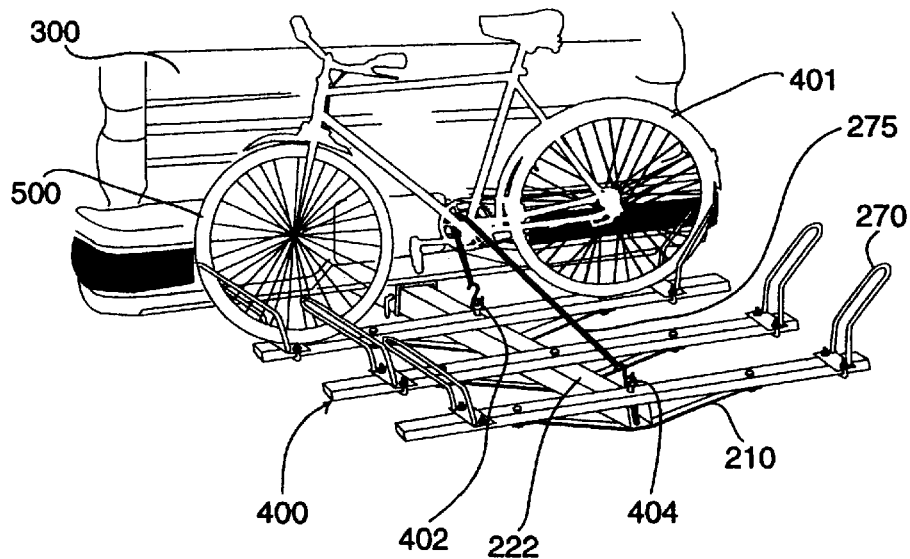
FIG. 12 shows the carrier device of FIG. 11 in operation supporting a bicycle and attached to the rear end of a vehicle.

FIGS. 11 and 12 illustrate an alternate embodiment of the present invention which features bike carrier 400 which includes a monolithic extension support 222 which results in a non-step up arrangement. The side rails 358 of the carrier 400 extend across the upper surface of monolithic extension support 222 and thus lie in a common plane. The manner of connection is similar to that of the embodiment of FIG. 8 in the use of a monolithic side rail and an underlying bridge brace 210 for each side rail. Cradle assemblies 270 are generally similar to that of the earlier embodiment but include a U-shaped outer extremity as opposed to the V-shaped section of the earlier described cradle embodiments. FIG. 11 also shows the advantageous providing of strap tie down eyelets that are provided by the use of eye-bolts 402 and 404 preferably provided on the interior and exterior most side rails (and functioning as side rail/extension support connectors as well). As shown in FIG. 12 by applying the opposite ends of the body of elastomeric strap 275 to the eye-bolts 402 and 404 across bike 401, there is provided a secure tie down arrangement that avoids bike frame scraping. FIGS. 11 and 12 also show that preferred number of bike support locations on this carrier is three due to a lack of a step up arrangement as in the last embodiments. FIG. 12 also shows loaded bike 500 supported on carrier 400 which is generally the same loading arrangement that would exist for the other embodiments. FIG. 12 also shows the use of a single strap to help lock in position the bike with respect to the carrier.

Figure 13:
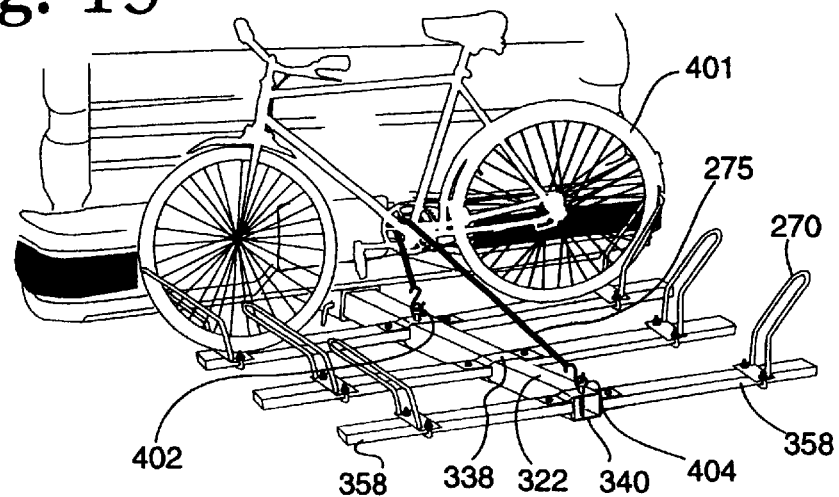
FIG. 13 shows a perspective view of a non-modular carrier device like that shown in FIG. 12 except having bridge bracing designed like that for the modular carrier structure shown in FIG. 1.

FIG. 13 shows a view similar to the view in FIG. 12, but with the use of a side rail/bridge brace securement arrangement like that in FIG. 1. Like FIG. 12, the embodiment shown in FIG. 13 has a monolithic extension support 322. Upper and lower bridge braces 338 and 340 thus sandwich the left and right side rails 358 into the aforementioned secure arrangement.

Figure 14:
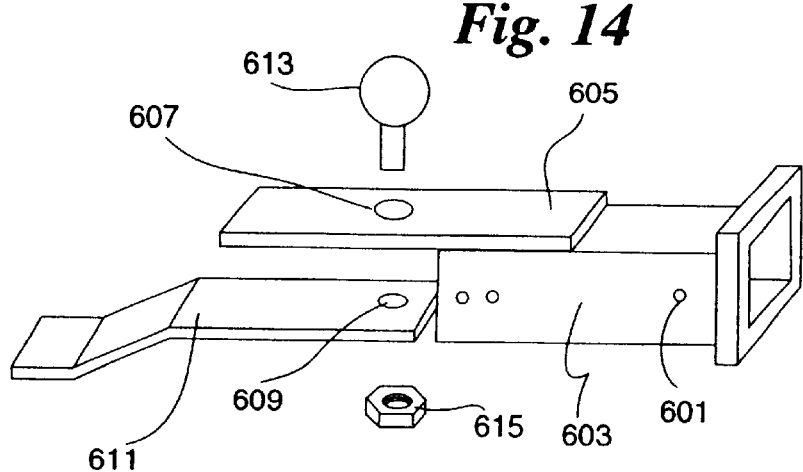
FIG. 14 shows an adaptor which can be used to modify a vehicle without a square hitch in its rear bumper area to one which includes a square hitch attachment and is readily able to handle a preferred modular carrier structure of the present invention or a non-modular carrier of the present invention.
Figure 15:
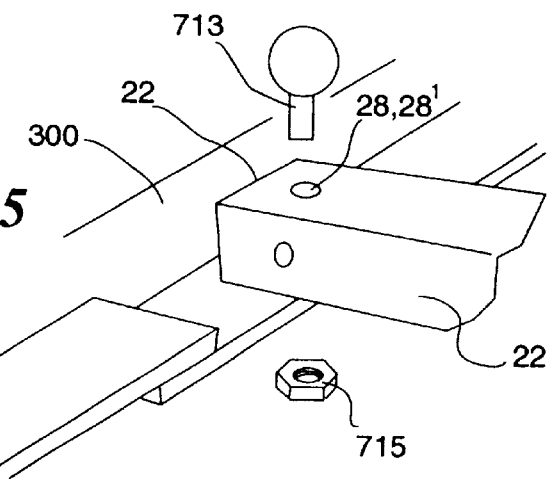
FIG. 15 shows an arrangement wherein the extension support of the present invention is attached to a tow ball support plate at the rear of a vehicle.

As the preferred design of the present invention features a tubular extension support for insertion in a square hitch, FIG. 14 illustrates an adaptor arrangement for converting a flat or platform tow ball hitch arrangement to one suited for reception of a tubular extension support. In FIG. 14 square hitch adaptor 601 includes a square hitch section 603 with a fixedly secured plate member 605 that has hole 607 designed to line up with hole 609 in platform 611. Thus the tow ball head member 613 can be inserted and locked in position with nut 615.

Although an adapter arrangement like that shown in FIG. 14 is possible when faced with a tow ball platform arrangement, from the standpoint of avoiding additional components to the self contained modular carrier structures as described above, an extension support such as 22 in FIG. 1 can be directly attached to the tow ball platform or the like through use of the first modular carrier connector set of holes and a tow ball pin connecter 713 and bolt 715.

Figure 16:
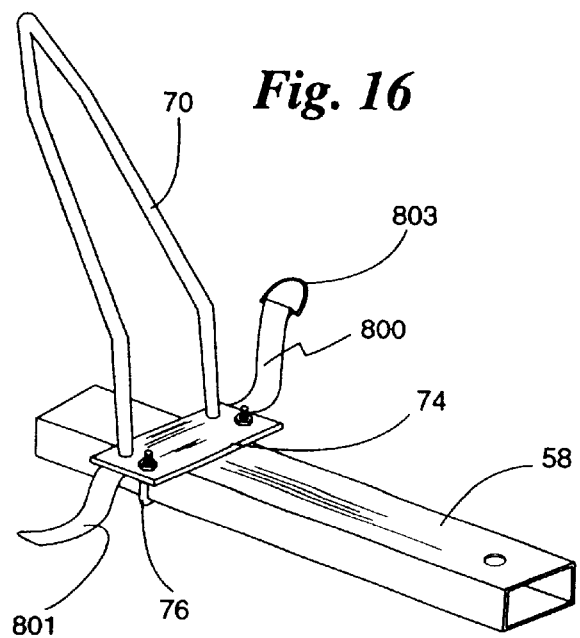
FIG. 16 shows a wheel hold down assembly secured to the rail by the cradle.

FIG. 16 shows rail 58 and cradle 70 as in the above described embodiment plus an added wheel hold down device 800 which features a flexible member 801 which in a preferred embodiment is a nylon continuous strap that has a width that fits between the side edge of plate 74 and U-bolt 76 and is pinched between said cradle 70 and supporting slide rail 58 upon said fix-in-position device (a U-bolt arrangement in the illustrated embodiment) being placed in a locked state. FIG. 16 also shows metal D-loop 803 which facilitates a tightening down of strap 800 around a bike wheel. Following a looping through a VELCRO hook and fastener pad connection arrangement is provided or similar connection means to prevent inadvertent release of a connected loop. Hold down device is particularly useful for use with the singular modular structure shown in FIG. 16 as it takes into consideration that there may only be connected to a vehicle a single modular structure in which case there would not be two eye loops for receipt of the end of tie down strap 275. By providing instead, however, the illustrated strap assembly 800 there is provided a hold down device that can be used to lock down both wheels of a bike at the two different cradle locations and which can also be used to supplement a tie down strap arrangement like that shown in FIG. 13.

Figure 17:
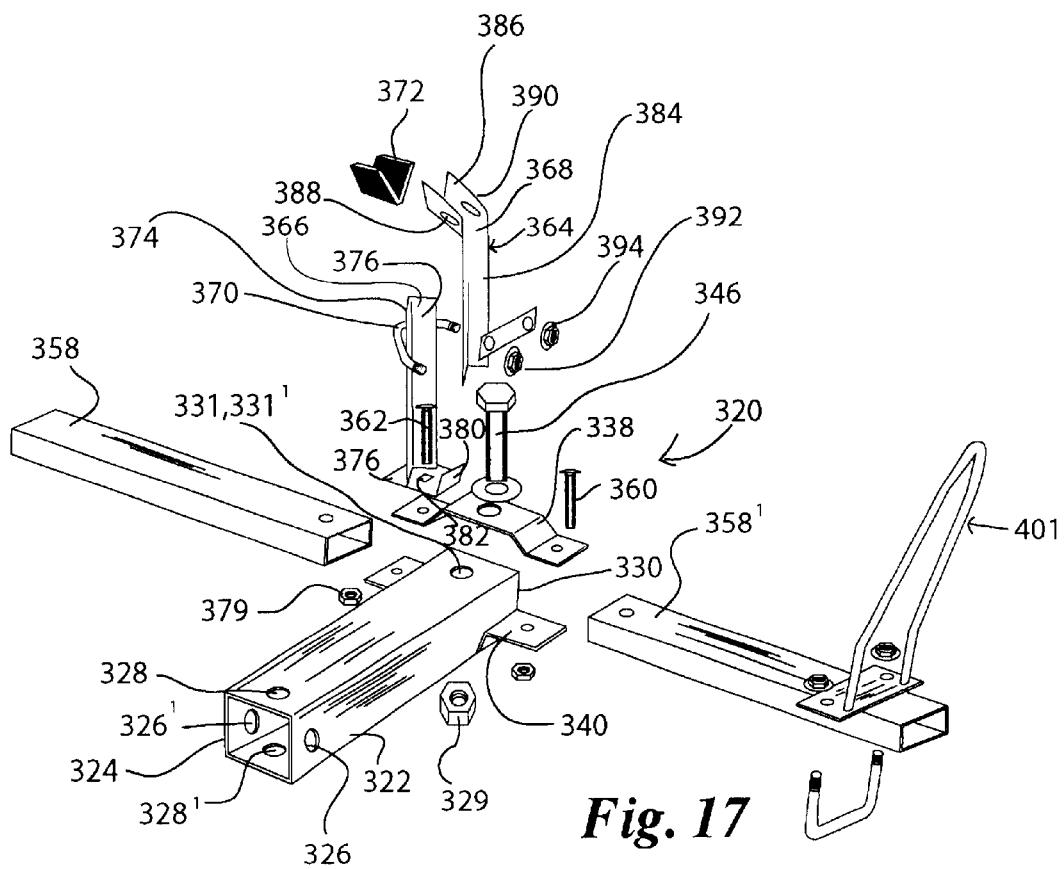
FIG. 17 illustrates an exploded view of an alternate carrier device embodiment of the present invention.
Figure 20:
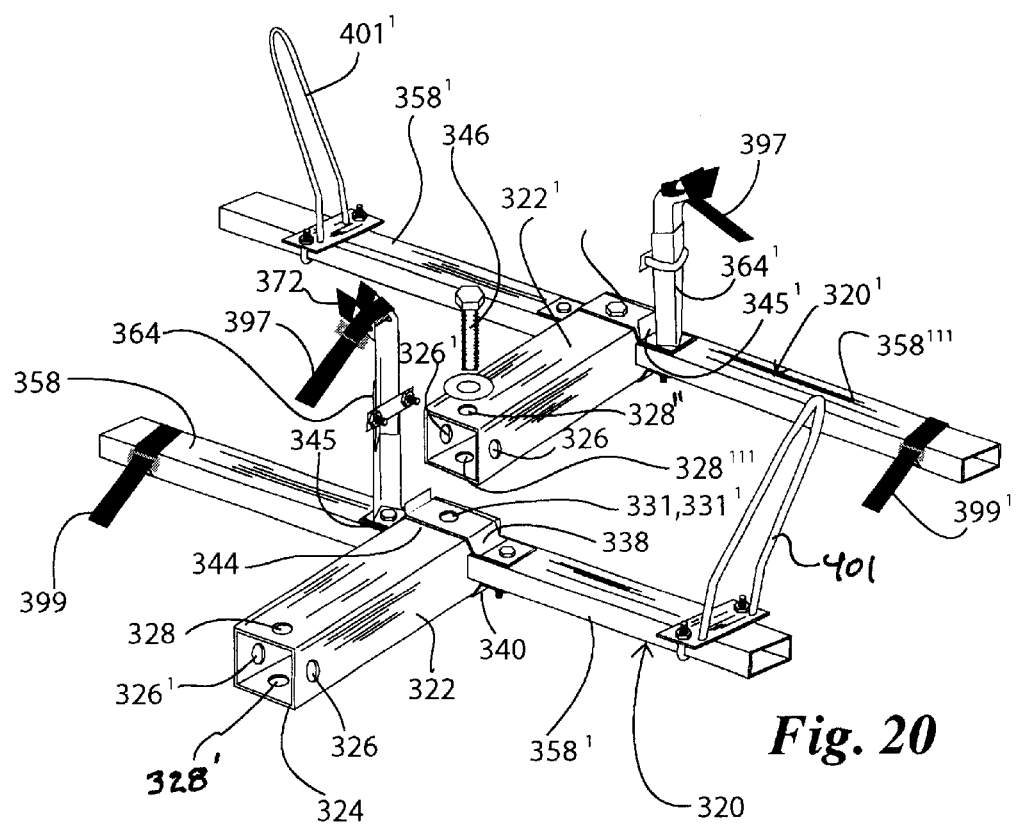
FIG. 20 shows an exploded view of first and second carrier devices of the FIG. 18 type being assembled in a stacked arrangement.

FIG. 17 shows an exploded view of an alternate embodiment of a modular carrier structure 320 of the present invention. As shown in FIG. 17, modular carrier structure 320 comprises extension support 322 having, at interior end 324 vehicle connection means having a first set of aligned holes 326, 326' (which, of course, would be representative of openings for a solid extension support) which are sized to receive a clevis pin or the like for locking extension support 322 following a telescopic insertion within the cavity of a vehicle trailer hitch or the like (see FIG. 10 for an example of a square hitch attachment). As shown in FIG. 17, first modular member connecting means includes a second set of holes 328, 328' which holes are vertically aligned and in a common cross-sectional plane with hole set 326, 326' (or close to the same—within a half inch or two). The opposite or exterior end 330 of extension support 322 includes second modular member connecting means featuring a set of vertically aligned holes 331, 331' (only one of the two holes shown). Vertically aligned holes 331, 331' are designed for alignment with holes 328, 328' of another modular carrier structure to achieve a stacked arrangement of modular carrier structures as shown in FIG. 20 and expanded in greater detail below.

FIG. 17 further shows upper bridge brace 338 and lower bridge brace 340 having the same structure as that of the aforementioned braces 38, 40. Hence, each bridge brace also features aperture 344 for receipt of a connector means 346 such as a bolt, nut and washer combination or some other suitable connector for connecting the upper and lower bridges 338, 340 with respect to extension support 322.

As with the earlier described embodiments, carrier structure 320 comprises a side rail structure shown as comprising side rails 358, 358' extending to opposite sides of extension support 322 and held in position by braces 338, 340 through side rail connectors 360, 362.

FIG. 17 further illustrates intermediate support device 364 which comprises first extension 366, second extension 368, position fixing device 370 and frame contact member 372. First extension 366 includes support post 374 which in the illustrated embodiment includes a vertical angle section 376 welded to flat base 378, with the latter including sloped contact flange 380 (matching the sloped portion of bridge brace 338) and aperture 382 for receiving connector 362.

Figure 18:
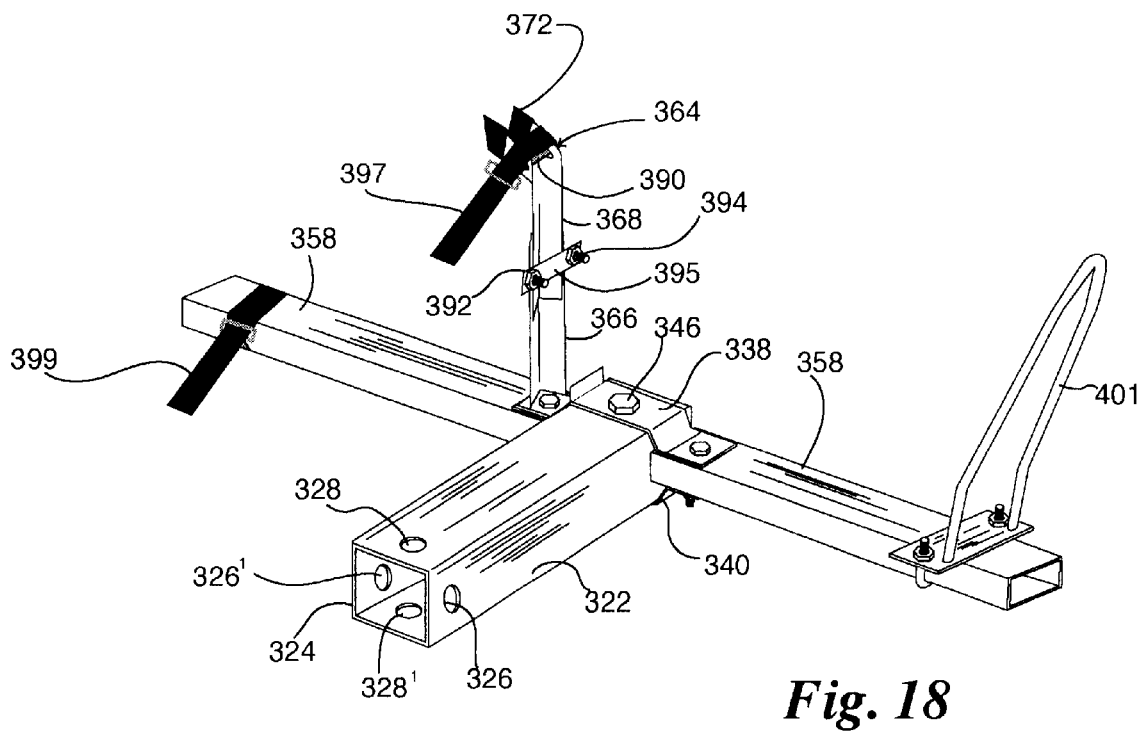
FIG. 18 illustrates, in perspective, the carrier device of FIG. 17 in a fully assembled state together with added wheel and bike frame hold down devices.
Figure 19:
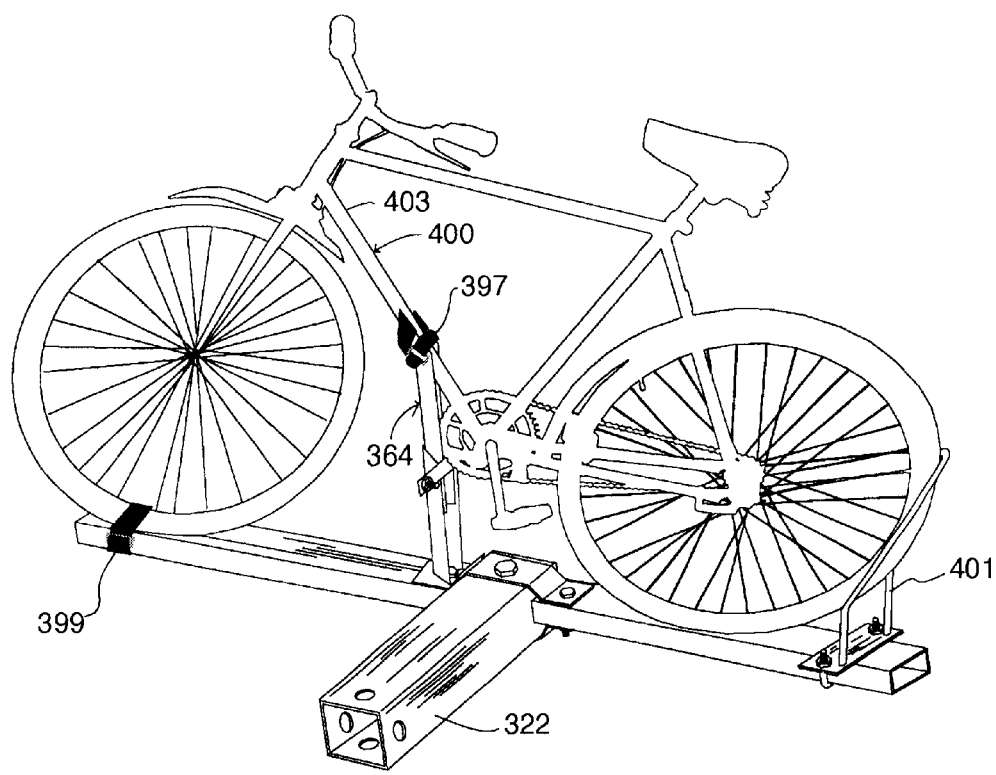
FIG. 19 illustrates the carrier device in FIG. 18 in operation in supporting a bicycle.

Second extension 368 also includes vertical angle section 384 which is slidingly received within angle section 376 and neck section 386 which is at an angle designed to conform to the lower sloped frame component of a typical bike frame (see FIG. 19). Neck section 386 further comprises slots 388, 390 (for receipt of strap 392 as shown in FIG. 18). Slots 388 and 390 are set back sufficiently so as to provide room for frame contact member 372 which in a preferred embodiment is a V-shape plastic member (or other low friction, non-abrading material such as an elastomeric material pad) that is adhered or otherwise affixed to or positioned within neck section 386. Upon tightening of bolts 392, 394, first and second extension 366, 368 became locked in the desired frame contact location by way of the compressive force of plate 395. Other suitable position fastening means are also contemplated under the present invention such as a series of holes aligned along one or both of first and second vertical extensions 366, 368.

With reference to FIGS. 18 and 19, the bike holding means of the present invention comprising first wheel hold down device 399, intermediate support device 364 (having frame hold down device 397 secured to lower, sloped frame bar 403 of bike 400) and cradle 401 (preferably adjustable with a similar U-bolt assembly as described for the above embodiments).

FIG. 20 illustrates first and second modular carrier structures 320 and 320' in position for fastening in a staggered or stepped up arrangement as described for the above-embodiments. As shown in FIG. 20, connector 346 is arranged so as to extend through aligned holes 328", 328'" in extension support 322' of the second modular carrier structure 322; through upper bridge brace 338 of the extension support 322, through aligned holes 331, 331' (see FIG. 17) and through the central opening in lower bridge brace 340 such that, upon tightening bolt 329, the above noted components are fixedly secured by the single connector for operation as a two bike or other object carrier.

FIG. 20 also shows the ease in which an alternating bike arrangement can be achieved under the present invention. As shown in FIG. 20, intermediate support (hold down) device 364 is secured in position on carrier 320 on the left side rail by way of a common fastener 345 extending through hole 382 in base plate 380 (FIG. 17), through the hole provided in the wing section of the upper bridge brace 338 through the aligned holes provided in the interior end of the side rail section 358 and then through the hole provided in lower bridge brace 340. The common fastener being held in position by way of nut 379 (FIG. 17). To the left of intermediate hold down device 364 is provided wheel hold down device 399, which, in a preferred form is a self-combined flexible strap with fixable strap adjustment means. To the right of device 364, and on the opposite side rail section 358 is provided cradle 401 having a similar structure to those described above.

Second carrier structure 320 has the same structural components as carrier structure 320, only the positioning of the intermediate hold down device 364', cradle 401' and hold down strap 399' are reversed with respect to which side rail section is involved. That is, in the illustrated embodiment of FIG. 20, strap 399' is provided on the free end of right side rail 358" as is intermediate hold down device 364', while cradle 401' is provided on the left side rail 358".

What is claimed is:

1. A bike carrier, comprising:
   an extension support having a vehicle support end and a second end;
   a side rail structure supported by said extension support and having a first section extending to a first side of said extension support and a second section extending to a second side of said extension support, and said first and second sections being arranged for supporting a respective wheel of a bike when in use;
   a first wheel hold down device positioned on the first section of said extension support;
   an intermediate support device supported by said extension support so as to contact a frame component of the bike when in use, and said intermediate support device includes an upper frame contact section; and
   wherein said upper frame contact section includes a sloped neck section which includes a frame reception recess having a slope generally corresponding to that of a sloped bike frame section received therein.

2. The bike carrier as recited in claim 1 further comprising:
   a frame contact insert of a different material than said neck section located within the frame reception recess for contact with the bike frame section in non-abrading fashion.

3. The bike carrier as recited in claim 2 further comprising a frame hold down device supported by said upper contact section.

4. The bike carrier as recited in claim 3 wherein said frame hold down device comprises a flexible strap received within slots formed in said neck section.

5. bike carrier, comprising:
   an extension support having a vehicle support end and a second end;
   a side rail structure supported by said extension support and having a first section extending to a first side of said extension support and a second section extending to a second side of said extension support, and said first and second sections being arranged for supporting a respective wheel of a bike when in use;
   a first wheel hold down device positioned on the first section of said side rail structure;
   an intermediate support device supported by said extension support so as to contact a frame component of the bike when in use;
   wherein said first wheel hold down device is configured for tire tread contact when the bike is in position on said bike carrier; and
   wherein said first wheel hold down device is a wheel cradle and said intermediate support device includes a neck section with a sloped reception recess section defining a recess for receiving a sloped frame section of a bike when in use.

6. The bike carrier as recited in claim 5 further comprising a second wheel hold down device which includes a flexible member for wrapping, when is use, about a wheel of the bike which is opposite the wheel received in said cradle.

7. The bike carrier as recited in claim 6 further comprising a frame hold down device which comprises a flexible member supported by said intermediate support device and positioned for wrapping about the sloped frame section of the bike and securing the sloped frame section to said intermediate support device.

8. The bike carrier as recited in claim 7 wherein each of said first and second wheel hold down devices are adjustable along said side rail with said first wheel hold down device is fixed in position by way of a strap wrap securement device while said cradle is fixed in position by way of a releasable side rail securement device.

9. A bike carrier, comprising;
an extension support having a vehicle support end and a second end;
a side rail structure supported by said extension support and having a first section extending to a first side of said extension support and a second section extending to a second side of said extension support, and said first and second sections being arranged for supporting a respective wheel of a bike when in use;
a first wheel hold down device positioned on the first section of said extension support;
an intermediate support device supported by said extension support so as to contact a frame component of the bike when in use;
a first bridge brace which is secured to said extension support and wherein said side rail structure includes first and second side rails having interior ends secured to said bridge brace and juxtaposed to respective sides of said support extension, and
wherein said intermediate support device is secured to said bridge brace.

10. The bike carrier as recited in claim 9 wherein a common connector releasably secures said intermediate support device to said bridge brace and one of said side rails to said bridge brace.

11. The bike carrier as recited in claim 10 wherein said bridge brace includes means for receiving said connector on an opposite side of said bridge brace such that the intermediate support device is securable at alternate sides of said extension support.

12. The bike carrier as recited in claim 10 wherein said common connector extends through a hole in a base of said intermediate support device, though a hole in said first bridge brace, and through a hole in said one of said side rails.

13. The bike carrier as recited in claim 9 further comprising a second bridge brace which is secured to an underlying surface of said extension support and said first and second side rails so as to sandwich the extension support and interior ends of said side rails between said first and second bridge braces.

14. A bike carrier, comprising;
an extension support having a vehicle support end and a second end;
a side rail structure supported by said extension support and having a first section extending to a first side of said extension support and a second section extending to a second side of said extension support, and said first and second sections being arranged for supporting a respective wheel of a bike when in use;
a first wheel hold down device positioned on the first section of said side rail structure;
an intermediate support device supported by said extension support so as to contact a frame component of the bike when in use;
wherein said intermediate support device includes a telescoping post section secured to said side rail structure;

wherein said intermediate support device includes an upper contact section which includes a neck section and a support post section supported by said extension support, and said intermediate support device further comprising a position adjustment device, and said upper contact section being adjustable with respect to the support post section and fixed in position by said position adjustment device at a desired bike frame contact height; and
said bike carrier further comprising a frame protector insert received in a recessed section of said neck section, and said bike carrier further comprising a frame hold down strap which is received by said neck section for assuming a wrap around relationship with respect to a sloped frame component of the bike.

15. A bike carrier, comprising:
an extension support having a vehicle support end and a second end;
a side rail structure supported by said extension support and having a first section extending to a first side of said extension support and a second section extending to a second side of said extension support, and said first and second sections being arranged for supporting a respective wheel of a bike when in use;
a first wheel hold down device positioned on the first section of said side rail structure;
an intermediate support device supported by said extension support so as to contact a frame component of the bike when in use;
wherein said first wheel hold down device is configured for tire tread contact when the bike is in position on said bike carrier;
wherein said bike carrier is a modular bike carrier with said extension support having vehicle connection apparatus at said vehicle support end, first modular connecting apparatus closer to said vehicle support end than said second end and second modular connecting apparatus closer to said second end than the vehicle support end,
wherein said side rail structure includes first and second side rails and a bridge brace supported by said extension support and secured to said first and second rails, and said bike carrier further comprising a connector that connects said bridge brace to said extension support and is of sufficient length to pass through two height lengths of said extension support for achieving connection of a second modular carrier of a common design.

16. A bike carrier assembly, comprising;
a first modular carrier structure which includes:
an extension support having a vehicle support end and a second end;
a side rail structure supported by said extension support and arranged for supporting wheels of a bike when in use;
a first wheel hold down device positioned on a first section of said side rail structure;
a vertical intermediate support device supported by said extension support so as to contact a frame component of the bike when in use; and
releasably attached to the first modular carrier structure is a second modular carrier structure which includes:
an extension support having a first end and a second end;
a side rail structure supported by the second modular carrier structure extension support and being arranged for supporting a respective wheel of a bike when in use;

a first wheel hold down device positioned on the first side of the second modular carrier structure side rail structure; and a vertical intermediate support device supported by the second modular carrier structure extension support so as to contact a frame component of a bike;

wherein said first and second modular carrier are connected with a connector which connects said first and second modular carrier structures in a stacked arrangement; and wherein the side rail structure of each of said first and second modular carrier structures comprises a bridge brace supported by a respective extension support and first and second side rails extending out to opposite sides of a respective extension support, and said connector extends through first modular connector means in said second modular carrier, through a bridge brace of said first modular carrier structure, and through second modular connecting means of said first modular carrier in connecting said first and second modular carrier structures in a stacked arrangement.

* * * * *